United States Patent [19]

Lenox

[11] 4,322,512

[45] Mar. 30, 1982

[54] PROCESS FOR TREATING POLYAMIDE TEXTILE MATERIALS WITH TRIMELLITIC ANHYDRIDE COMPOUND

[75] Inventor: Ronald S. Lenox, Lancaster, Pa.

[73] Assignee: Armstrong World Industries, Inc., Lancaster, Pa.

[21] Appl. No.: 171,299

[22] Filed: Jul. 23, 1980

[51] Int. Cl.³ .................... C08G 69/48; D06M 13/20
[52] U.S. Cl. ........................................ 525/420; 8/115.5
[58] Field of Search .................. 525/420; 528/342; 8/115.5

[56] References Cited

U.S. PATENT DOCUMENTS

| | | | |
|---|---|---|---|
| 2,416,884 | 3/1947 | Schreiber et al. | 8/115.5 |
| 2,855,267 | 10/1958 | Zimmerman | 8/115.5 |
| 2,952,506 | 9/1960 | Dellis | 8/115.5 |
| 3,025,127 | 3/1962 | Iannaroue | 8/115.5 |
| 3,104,933 | 9/1963 | Mendelsohn | 8/115.5 |
| 3,454,351 | 7/1969 | Perry | 8/115.5 |
| 3,564,630 | 2/1971 | Mousalli | 8/115.5 |
| 3,719,641 | 3/1973 | Campbell et al. | 525/420 |

*Primary Examiner*—Harold D. Anderson
*Attorney, Agent, or Firm*—Daniel DeJoseph

[57] ABSTRACT

A method for improving the cationic or basic dye uptake of a polyamide textile material which is normally susceptible to anionic or acid dyes which comprises pretreating the polyamide textile material with a substituted trimellitic anhydride compound. The process of the present invention also decreases the textile material's affinity for acid dyes.

8 Claims, No Drawings

PROCESS FOR TREATING POLYAMIDE TEXTILE MATERIALS WITH TRIMELLITIC ANHYDRIDE COMPOUND

BACKGROUND OF THE INVENTION

Polyamide materials, in particular nylon fibers and yarns, are of great value in the textile industry. It is well known that such materials are typically receptive to acid (anionic) dyes but have practically no affinity for basic (cationic) dyes. This latter characteristic is a disadvantage in that basic dyes are known to impart brighter shades than acid dyes to textile materials. Thus, normally only certain types of color effects, consistent with the characteristics of acid dyes, can be produced on typical, untreated polyamide textile materials. Thus, it is desirable to produce polyamide textile materials that have increased receptivity to basic dyes.

SUMMARY OF THE INVENTION

According to the invention, there is provided a process for pretreating polyamide materials which are normally susceptible to acid dyes to improve the materials' base dyeability. Polyamide materials treated according to the process of the invention also exhibit improved resistance to acid dyes without substantially lowering the material's break strength. The process of the present invention comprises reacting polyamide materials with substituted trimellitic anhydride compounds in a suitable solvent for the substituted trimellitic anhydride compounds.

DETAILED DESCRIPTION OF THE INVENTION

The polyamide textile materials which are treated according to the process of the present invention are normally susceptible to acid dyes and have free amine ends. Such textile materials comprise fabrics, fibers, filaments, yarns, pellicles, blocks and the like, which are produced from a linear polyamide containing recurring units of the formula

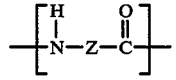

wherein Z is a member of the class consisting of a divalent hydrocarbon radical containing from 1 to 20 carbon atoms and a divalent radical of the formula

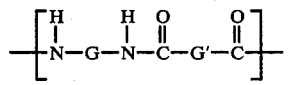

wherein G and G' are divalent hydrocarbon radicals independently containing from 1 to about 20 carbon atoms. Particularly suitable textile materials include nylon polymers such as nylon 66, a condensation product of adipic acid and hexamethylenediamine; nylon 6, a polymer of caprolactam; nylon 4, which is based on butyrolactam (2-pyrolidone); and nylon 610, which is obtained by condensation of sebacic acid and hexamethylenediamine.

In accordance with this invention a polyamide textile material is reacted with one or more substituted trimellitic anhydride compounds of the Formula I,

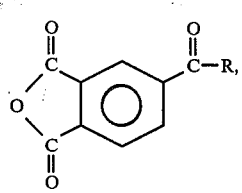

wherein R represents halogen or a ring nitrogen atom-containing heterocylic radical containing 5 to 15 ring atoms, wherein said radical is bonded to the carbon by a ring nitrogen atom and wherein said radical is obtained by removing a hydrogen atom from nitrogen-containing heterocylic compounds which include imidazole, triazole, tetrazole, pyrrole, oxazole, thiazole, pyrazole, 3-pyrroline, pyrrolidine, pyridine, pyrimidine, purine, quinoline, isoquinoline, indole and carbazole.

At the conclusion of the reaction the polyamide textile materials are solvent washed and subsequently dried. The fibers may then be stored until used.

Any solvent that will dissolve the substituted trimmelitic anhydride compound(s) of Formula I and which has a boiling point of at least 60° C. will be suitable for use in the process of the invention. Examples of suitable solvents include aromatic solvents such as toluene, xylene and benzene; ether solvents such as ethylene glycol dimethyl ether (glyme), diethylene glycol dimethyl ether and triethylene glycol dimethyl ether; ester solvents such as ethyl acetate and propyl acetate; hydrocarbon solvents such as n-octane and isoctane; and aprotic solvents such as dimethyl formamide (DMF), heterocyclic solvents such as tetrahydrofuran (THF), and dioxane. It is understood that the choice of a reaction solvent will be dependent on the particular trimellitic anhydride compound that is utilized.

The substituted trimellitic anhydride compounds and the polyamide textile material are reacted at a temperature of from about 60° C. to about 140° C. for from about 1 minute to about 300 minutes. It is understood that there does not have to be complete reaction between the polyamide textile material and the substituted trimellitic anhydride compound in order for the polyamide textile material to show a significant increase in its receptivity to basic dyes. In fact, it is understood that the practitioner of this invention can, by varying the reaction time and temperature, control the polyamide textile material's receptivity to basic dyes according to his individual needs. However, textile materials which are reacted at temperatures at or exceeding 120° C. for about 60 minutes or longer may (depending on the particular substituted trimellitic anhydride compound and solvent being utilized), while showing a marked increase in their affinity for basic dyes and a decrease in their affinity for acid dyes, begin to show a corresponding drop in break strength. For example, at such high temperatures trimellitic anhydride acid chloride is generally more harmful to the break strength of a polyamide textile material than the heterocylically-substituted trimellitic anhydride compounds discussed herein. The individual practitioner of this invention will, in any event, have to determine if a possible drop in break strength is offset by the value of the textile material's increased affinity for basic dyes.

In the process of the present invention from about 0.1 to about 5 grams, and preferably from about 0.5 to about 2.4 grams, of the substituted trimellitic anhydride compound are employed for every gram of polyamide fiber that is treated.

The polyamide textile materials, when in yarn fiber form, that are pretreated according to the process of the present invention may first, prior to such pretreating steps, be scoured, such as by being solvent and water washed at high temperatures to thereby remove fiber dressing and spinning aids. This scouring and subsequent drying step is considered to be optional, and not essential, to the process of the present invention.

Trimellitic anhydride acid chloride, which is utilized in the process of the present invention, is available commercially. The substituted trimellitic anhydride compounds, wherein the "R" of Formula I represents a nitrogen-containing heterocyclic radical are prepared by the reaction of trimellitic anhydride acid chloride with the corresponding nitrogen containing heterocylic compound in a suitable solvent, such as tetrahydrofuran (THF).

The reaction mixture is maintained at from about 45° C. to about 55° C. with agitation until substantial completion of the reaction, usually from about 60 to about 90 minutes. Upon completion of the reaction, the reaction mixture is filtered and the filtrate is allowed to stand for at least one hour, during which time the desired substituted trimellitic anhydride product precipitates. The product compound is recovered by filtration and is purified, such as by being recrystallized from a toluene/THF solution, and dried. The molar ratio of the heterocyclic starting material to the trimellitic anhydride acid chloride (TMAAC) starting material can range from about 1.9 to 1 to about 2.1 to 1. The preferred molar ratio of the heterocyclic starting material to TMAAC is 2 to 1.

DESCRIPTION OF THE PREFERRED EMBODIMENT

The following examples illustrate the present invention and the manner by which it can be practiced but as such should not be construed as limitations upon the overall scope of the same.

EXAMPLE I

Preparation of N-(1,3-dihydro-1,3-dioxo-5-isobenzofurancarboxyl) imidazole. This example illustrates producing a heterocyclic trimellitic anhydride compound, useful in the process of the present invention, from trimellitic anhydride acid chloride. Recrystallized imidazole (34.05 g, 0.50 mol) was dissolved in 300 ml of dry THF and placed in a 500 ml round bottom flask. Trimellitic anydride acid chloride (52.65 g, 0.25 mol) was dissolved in 100 ml dry THF and added dropwise to the imidazole over a thirty minute period. The apparatus was fitted with a $CaCl_2$ drying tube. When addition was complete, the flask and its contents were heated to 50° C. and maintained at that temperature for one hour. The hot reaction mixture was filtered to remove the imidazole hydrochloride by-product and the filtrate set aside until the product crystallized. The solid product was then collected, recrystallized from 900 ml of toluene/THF (1:9 vol) and dried in vacuo to give 39.0 g (64% yield) of the desired product; mp 173.5°–175.5° C.

Analysis for: $C_{12}H_6N_2O_4$;

Calcd: C, 59.51%; H, 2.50%; N, 11.57%; Found: C, 59.34%; H, 2.74%; N, 11.50%.

NMR and IR confirmed the assigned structure.

EXAMPLES 2 AND 3

These examples illustrate the process of the present invention.

In these examples, bulk continuous filament nylon 66 yarn, available from E. I. DuPont de Nemours and Co. under the trade designation "DuPont 1325-88-0-746 Brt." was first scoured using three tetrachlorodifluoroethane washers followed by three water washes at 80° C. The yarn fibers were air dried and then stored over $P_2O_5$ at high vacuum to remove excess water so that masses of dry fiber could be obtained for accuracy of measurement.

The yarn fibers were reacted with the heterocylic trimellitic anhydride product compound of Example 1, in toluene at the parameters which are set forth in Table 1.

The thus treated fibers were soaked in room temperature toluene for 15 minutes to remove excess substituted trimellitic anhydride reactant and were then stored at 80° C. at high vacuum overnight to remove the solvent and any water present so that percent weight increases could be calculated for accuracy of measurement. If desired, the treated fibers may be dyed without being subjected to these intermediate steps.

The treated fibers were dyed at 100° C. by immersion in a standard solution of CI Basic Blue 22 dye, which is available from DuPont under the trade designation Sevron 2G. The dye solution was prepared by dissolving 0.2 g of the above dye in 0.875 g of ammonium formate in enough water to give 500 ml of solution. The solution's pH, at 23° C., ranged from 6.50 to 6.55 pH. To measure dye uptake, dye trials were run for one hour. At the end of this time excess dye was water rinsed from the fibers back into the dyebath. When cooled, the dyebaths were redituted to 500 ml and the remaining dye was quantitated at 630 nm on a Cary spectrophotometer. The amount of dye on the fiber was calculated and the results are set forth in Table I.

In a comparative example, the above procedure was repeated exactly, except that the fibers were not pretreated according to the process of the invention, although they were immersed in the solvent at 110° C. for 60 minutes. The results of this comparative example are set forth in Table 1 across from the heading marked "Control 1."

In another comparative example, nylon 66 yarn was scoured, washed and dried and then dyed according to the procedures set forth above. The results of this comparative example are set forth in Table 1 across from the heading marked "Control 2."

TABLE 1

| Example | Anhydride Compound (gms) | Volume Toluene Solvent (ml) | Reaction Temperature (°C.) | Reaction Time (min) | Weight Nylon Fiber Before Treatment (gm) | Percent Weight Increase of Nylon Fiber After Treatment | Breaking Strength of Nylon Fiber After Treatment (Max lbs. Pull) | g Dye ($\times 10^3$)/ g Nylon Fiber |
| --- | --- | --- | --- | --- | --- | --- | --- | --- |
| 2 | 1.5 | 160 | 110 | 30 | 1.953 | 2.97 | 9.30 | 5.9 |
| 3 | 1.5 | 160 | 110 | 60 | 1.941 | 3.10 | 8.87 | 6.5 |
| Control 1 | — | 160 | 110 | 60 | 1.958 | — | 8.92 | 2.0 |
| Control 2 | — | — | — | — | 1.928 | — | 8.80 | 1.0 |

The data from the above examples, as set forth in Table 1, indicate that the treated nylon yarn showed an increase of about 300% in base dye affinity over the untreated nylon yarn that were immersed in the solvent and about a six fold increase in base dye affinity over the nylon yarn that were not immersed in the solvent. The data set forth in Table 1 also indicate that the treated yarn showed little or no decrease in break strength over the untreated articles and, in Example 2, showed an increase in break strength over the untreated yarn.

EXAMPLES 4–10

In these examples, the procedures of Examples 2–3 were generally repeated exactly, except that certain reaction parameters were varied and the compound utilized in the pretreating step was trimellitic anhydride acid chloride. The reaction parameters and the results are set forth in Table 2. For convenience, the results of Controls 1 and 2 are also set forth in Table 2.

TABLE 2

| Example | Trimellitic Anhydride Compound Wt. (gms) | Solvent | Solvent Vol. (ml) | Reaction Temp. (°C.) | Reaction Time (min) | Weight of Nylon Fiber Before Treatment (gm) | Percent Weight Increase of Nylon Fiber after Treatment | Breaking Strength of Nylon Fiber After Treatment (Max. lbs Pull) | g Dye ($\times 10^3$)/ g Nylon Fiber |
| --- | --- | --- | --- | --- | --- | --- | --- | --- | --- |
| 4 | 2 | toluene | 160 | 110 | 5 | 1.917 | 1.31 | 8.99 | 9.4 |
| 5 | 2 | toluene | 160 | 110 | 15 | 1.949 | 1.92 | 8.77 | 18.7 |
| 6 | 2 | toluene | 160 | 110 | 30 | 1.915 | 2.88 | 8.05 | 24.5 |
| 7 | 2 | toluene | 160 | 110 | 180 | 1.964 | 5.59 | 6.66 | 35.9 |
| 8 | 2 | toluene | 160 | 65 | 60 | 1.962 | 0.35 | 9.06 | 3.9 |
| 9 | 2 | glyme | 160 | 84 | 60 | 1.951 | 0.67 | 8.61 | 5.6 |
| 10 | 2 | THF | 160 | 65 | 60 | 1.949 | 0.42 | 8.50 | 2.7 |
| Control 1 | — | toluene | 160 | 110 | 60 | 1.958 | — | 8.92 | 2.0 |
| Control 2 | — | — | — | — | — | 1.928 | — | 8.80 | 1.0 |

EXAMPLES 11–13

These examples illustrate the effect of the dyeing time on the total basic dye uptake by nylon fibers which were pretreated with trimellitic anhydride acid chloride according to the process of this invention. In these examples, the procedures of Examples 2–3 were generally repeated exactly, except for the modifications which are set forth in Table 3. Approximately 2 gram portions of nylon fiber were employed in each example. Toluene was the solvent used in the pretreating step in each of these examples. For convenience, the results of Control 1 and Control 2 are also set forth in Table 3.

TABLE 3

| Example | Weight of Trimellitic Anhydride Compound (gms) | Volume Solvent (ml) | Reaction Temp. (°C.) | Reaction Time (min) | Dyeing Time (min) | g Dye ($\times 10^3$)/ g Nylon Fiber |
| --- | --- | --- | --- | --- | --- | --- |
| 11 | 2 | 160 | 110 | 60 | 15 | 31.8 |
| 12 | 2 | 160 | 110 | 60 | 30 | 25.7 |
| 13 | 2 | 160 | 110 | 60 | 60 | 36.1 |
| Control 1 | — | 160 | 110 | 60 | — | 2.0 |
| Control 2 | — | — | — | — | — | 1.0 |

EXAMPLES 14–19

These examples illustrate how polyamide textile materials treated according to the process of this invention typically show decrease in their affinity to acid dyes.

In these examples, nylon yarns similar to those used in the previous examples were scoured, washed and dried and then pretreated with a trimellitic anhydride compound according to the procedures as described in Examples 2 and 3. In Examples 14 and 15 the trimellitic anhydride compound used was N-(1,3-dihydro-1,3-dioxo-5-isobenzofurancarboxyl) imidazole; in Examples 16-19 it was trimellitic anhydride acid chloride.

Approximately 1 gram portions of the treated fibers were dyed for one hour at 100° C. in 500 ml of a solution prepared by dissolving 0.375 g of CI Acid Red 1 in 500 ml of water. Sufficient formic acid was added to make the pH of the solution 3.2. Dye uptake was quantitated by dissolving the dyed fibers in 88–90% reagent grade formic acid and measuring the absorbance of the resulting solutions at 540 nm. In a comparative example, nylon 66 yarn was scoured, washed and dried and then dyed according to procedures set forth above. The experimental conditions and results are set forth in Table 4. The results of the comparative example are set forth in Table 4 across from the heading marked CONTROL.

TABLE 4

| Example | Anhydride Compound (gms) | Volume Solvent (ml) | Solvent | Reaction Temp (°C.) | Reaction Time (min) | gram Acid Dye (× 10³)/ gram Nylon Fiber |
| --- | --- | --- | --- | --- | --- | --- |
| 14 | 0.5 | 80 | DMF | 100 | 60 | 6.67 |
| 15 | 0.5 | 80 | DMF | 100 | 30 | 6.85 |
| 16 | 1.0 | 80 | toluene | 110 | 60 | 0.28 |
| 17 | 1.0 | 80 | toluene | 110 | 30 | 0.44 |
| 18 | 1.0 | 80 | toluene | 110 | 15 | 0.70 |
| 19 | 1.0 | 80 | toluene | 110 | 5 | 1.32 |
| Control | — | — | — | — | — | 13.10 |

What is claimed is:

1. A process for increasing the cationic dye uptake of a polyamide textile material which is normally susceptible to acid dyes which comprises reacting the polyamide material with a trimellitic anhydride compound having the formula

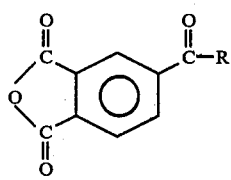

wherein R represents halogen or a ring nitrogen atom-containing heterocylic radical containing 5 to 15 ring atoms, wherein said radical is directly bonded to the carbonyl carbon by a ring nitrogen atom, in an inert solvent for the trimellitic anhydride compound.

2. The process of claim 1 wherein R represents Cl.

3. The process of claim 1 wherein R represents an imidazole radical.

4. The process of claim 1 wherein the solvent is an aromatic or ether solvent.

5. The process of claim 4 wherein the solvent is toluene.

6. The process of claim 4 wherein the solvent is tetrahydrofuran.

7. The process of claim 1 wherein the solvent is dimethyl formamide.

8. The process of claim 1 wherein the polyamide material is nylon 66.

* * * * *